(12) United States Patent
Tuilier et al.

(10) Patent No.: US 9,668,119 B2
(45) Date of Patent: May 30, 2017

(54) METHOD FOR ATTACHING A ROAMING TELECOMMUNICATION TERMINAL TO A VISITED OPERATOR NETWORK

(71) Applicant: GEMALTO SA, Meudon (FR)

(72) Inventors: Edmond Tuilier, La Ciotat (FR); Jean-François Kuc, La Ciotat (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/412,713

(22) PCT Filed: Jul. 1, 2013

(86) PCT No.: PCT/EP2013/063869
§ 371 (c)(1),
(2) Date: Jan. 5, 2015

(87) PCT Pub. No.: WO2014/006009
PCT Pub. Date: Jan. 9, 2014

(65) Prior Publication Data
US 2015/0195701 A1     Jul. 9, 2015

(30) Foreign Application Priority Data
Jul. 6, 2012    (EP) .................................. 12305812

(51) Int. Cl.
| H04W 4/00 | (2009.01) |
|---|---|
| H04W 8/02 | (2009.01) |
| H04W 60/06 | (2009.01) |
| H04W 76/02 | (2009.01) |
| H04W 8/12 | (2009.01) |

(52) U.S. Cl.
CPC ............. H04W 8/02 (2013.01); H04W 60/06 (2013.01); H04W 76/021 (2013.01); H04W 8/12 (2013.01)

(58) Field of Classification Search
CPC ...................................................... H04W 8/18
USPC .......................................................... 455/433
See application file for complete search history.

(56) References Cited

U.S. PATENT DOCUMENTS

| 2004/0192306 A1 | 9/2004 | Elkarat et al. |
|---|---|---|
| 2005/0059430 A1* | 3/2005 | Beeman ............... H04L 63/0853 455/558 |
| 2006/0003763 A1* | 1/2006 | Almgren ................. H04W 8/08 455/432.1 |
| 2006/0116122 A1* | 6/2006 | Verma ................. H04L 63/0407 455/435.1 |

(Continued)

FOREIGN PATENT DOCUMENTS

| EP | 1 463 366 A2 | 9/2004 |
|---|---|---|
| WO | WO 2011/094709 A1 | 8/2011 |

OTHER PUBLICATIONS

International Search Report (PCT/ISA/210) mailed on Nov. 4, 2013, by the European Patent Office as the International Searching Authority for International Application No. PCT/EP2013/063869.

*Primary Examiner* — Santiago Garcia
(74) *Attorney, Agent, or Firm* — Buchanan Ingersoll & Rooney PC

(57) ABSTRACT

The invention concerns a method for attaching a roaming telecommunication terminal to a visited network, the terminal having a security element. The method includes transmitting from the home network to the terminal a rejection message that is function of the features of the terminal and the security element.

10 Claims, 1 Drawing Sheet

(56) References Cited

U.S. PATENT DOCUMENTS

| | | | |
|---|---|---|---|
| 2007/0049269 A1 | 3/2007 | Ophir et al. | |
| 2007/0054665 A1 | 3/2007 | Elkarat et al. | |
| 2007/0249338 A1* | 10/2007 | Schwalb | H04W 8/04 455/433 |
| 2008/0020756 A1 | 1/2008 | Jiang | |
| 2009/0282251 A1* | 11/2009 | Cook | H04L 63/062 713/171 |
| 2010/0125899 A1* | 5/2010 | Tinnakornsrisuphap | H04L 63/101 726/12 |
| 2010/0190497 A1* | 7/2010 | Pudney | H04W 12/08 455/435.1 |
| 2011/0194553 A1* | 8/2011 | Sahin | H04L 12/66 370/352 |
| 2011/0281582 A1 | 11/2011 | Jiang | |
| 2011/0294472 A1* | 12/2011 | Bramwell | H04W 8/04 455/413 |
| 2013/0185368 A1* | 7/2013 | Nordstrom | H04L 51/32 709/206 |

\* cited by examiner

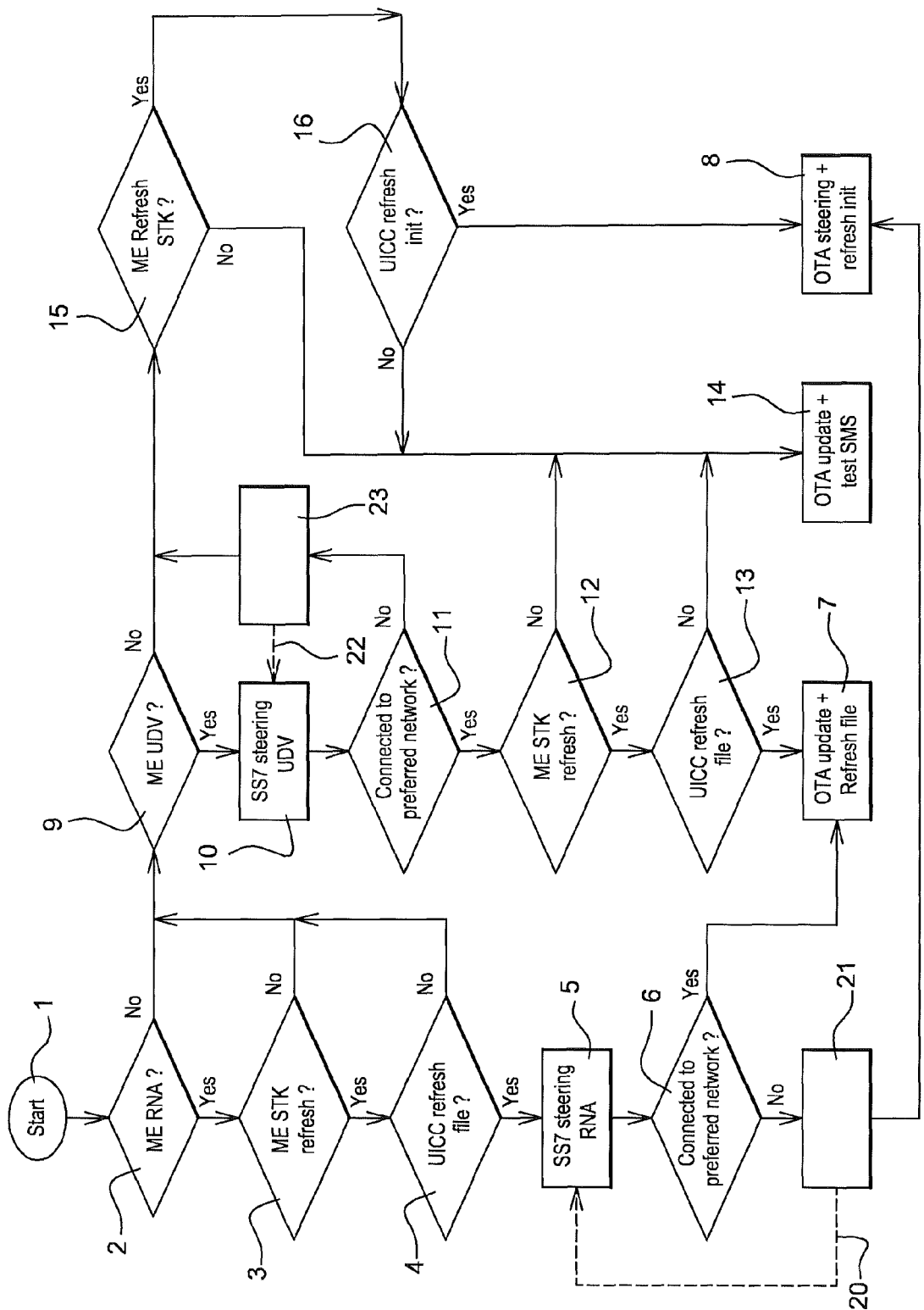

METHOD FOR ATTACHING A ROAMING TELECOMMUNICATION TERMINAL TO A VISITED OPERATOR NETWORK

The present invention concerns a method for attaching a roaming telecommunication terminal to a visited operator network.

Steering of roaming, or "preferred roaming", is the process by which a mobile operator decides which partner their subscribers will use whilst roaming. There are many mobile or cellular network operators, or providers, in the world, often more than one in a single country. These network operators include, but are not limited to, operators who provide mobility services using GSM, GPRS, 3G, CDMA, TDMA, and WCDMA technology. These network operators provide voice and data services to their own subscribers and to subscribers from other networks. When the network operator provides service to a subscriber from a foreign country, it is referred to as "international roaming". When the network operator provides service to a subscriber from another network in the same country, it is referred to as "national roaming".

When the subscriber is registered in the network with which it has a direct billing relationship, the serving network is often referred to as the Home Public Mobile Network or HPMN. If the subscriber is in a network with which it does not have a direct billing relationship, the serving network is referred to as the Visited Public Mobile Network or VPMN, and the subscriber is referred to as an in-roamer by the VPMN. The same subscriber is referred to as an out-roamer by the HPMN. In such a case, the in-roamers are treated as temporary subscribers from a service availability perspective, while the billing for usage incurred by them is through inter-carrier settlements via the home network of the subscriber.

Various network operators have partnership agreements with each other that include more favorable roaming charges than non-partners receive. Partner networks are "preferred" networks for the network operator's subscriber to register with when roaming. Non-partner networks are "non-preferred" networks to the subscriber. Network operators can maximize their margins and the roamers can get more attractive roaming rates and services if roamers roam on their home mobile operator's preferred partner networks.

When "home" subscribers roam into visited networks, they may roam onto one, two or more VPMNs, any one at a time, based on various criteria. To better understand this, consider the cases when the handset can be in one of two modes: automatic network selection mode; or manual network selection mode.

In automatic mode, the handset automatically uses a set of rules to find the network to register with. The order of these rules may be handset vendor dependent; however, industry specifications state the order as:
1. The last selected network (from EFLOCI on the UICC, the UICC being for example a SIM card or an embedded UICC not removable from the terminal, also called e-UICC);
2. The home network if its available (based on MCC and MNC from the IMSI stored in the UICC);
3. If the last registered network is not found, the handset tries to register on the list of networks from the Preferred PLMN List (EFPLMNSEL on the UICC) in priority order excluding the previously selected PLMN (the handset scans the GSM 900 frequency band before it scans the GSM 1800 frequency band);
4. Other PLMN with a received signal level above −85 dBm in random order excluding the previously selected PLMN; and
5. Any other PLMN excluding the previously selected PLMN in order of decreasing signal strength or alternatively the previously selected PLMN may be chosen ignoring its signal strength.

In manual mode, the handset shows a list of available networks to the user. The user selects one of them and the handset attempts registration onto that network. If the registration is not successful, the handset shows the list of networks to the user once again. In manual mode, the user has selected a particular network, so preferred VPMN selection from the HPMN perspective should not apply. However, a majority of current handsets are in automatic selection mode, and the HPMN is keen on controlling and/or influencing the roaming network chosen by its out-roamers. Also, since the HPMN would like to honor the manual selection mode, it has to identify the current settings on the handset. However, implementing a seamless mechanism to do this has been a challenge thus far.

Over the last few years, the revenues to network operators from home subscribers have consistently declined due to increased competition and resulting pricing pressures. On the other hand, revenues from roamers have consistently grown in the same period due to increased mobile penetration in local markets and an increase in travel. Moreover, roaming revenues are high-margin revenues that typically comprise between 8-25% of the total network operator revenues. Hence, protecting the existing roaming revenues and growing them further has become an important priority for the network operators worldwide.

Some operators also own networks in various countries. These operators would like to make sure their out-roamers stay within the group properties, or stay on preferred networks, in order to gain the best service experience even when roaming. They will also be able to offer geography based price plans (for example, a single rate all across Western Europe or South East Asia) to users who have subscribed to such plans. In addition, as new technologies keep rolling out, they can control the rollout schedule across their own properties and also make sure interoperability issues are taken care of. Keeping roaming subscribers on preferred networks gives the best service experience to the subscriber. However, current methods of controlling which network a subscriber registers on when roaming have disadvantages.

For example, a commonly-used method of attempting to prevent roaming subscribers from registering with non-preferred networks includes storing a list of preferred networks on a SIM in the subscriber's handset (a Preferred PLMN list). The list can be updated using Over-The-Air (OTA) messages. This list influences the initial selection of the preferred network. However, due to various reasons (for example, the preferred network is not currently available or there is a temporary loss of coverage), the handset may also select a non-preferred network. Once the user is on a non-preferred network, he/she will remain there unless the non-preferred network loses the radio coverage. Even when the handset is powered off, the non-preferred network stays on the SIM card and on next power on it will be selected according to rules described herein. Thus, once the handset initiates an attempt to register on a non-preferred network, the network operator loses control of the roamer. In order to steer the handset on a preferred network, SS7 (Signalling System No. 7) rejection messages (RNA or UDV rejection messages) can be sent to the handset. However, such rejection messages do not ensure that the handset will connect to a preferred network, especially when the power signal received from a base station of a preferred network is below a given threshold (−85 dB). In this case, the handset will automatically try to connect to another network, even if not present in the list of the preferred networks, this other network presenting a better power signal than a preferred network.

It would be advantageous for the network operator to retain some control over a roaming subscriber handset even when a handset has initiated a registration attempt with a non-preferred network for any reason, such as failure of the SIM network list to produce registration on a preferred network.

It is known that some steering techniques do not work on some mobile equipments (mobile phones, computers, vehicles comprising UICCs or e-UICCs). The SS7 network is the network in charge of transporting the messages exchanged between the gateways (MSC, switchs) and the databases of the HPMN and VPMN (HLR, VLR, EIR, . . . ). SS7 is a set of telephony signaling protocols which are used to set up most of the world's public switched telephone network telephone calls. The main purpose is to set up and tear down telephone calls. Other uses include number translation, local number portability, prepaid billing mechanisms, short message service (SMS), and a variety of other mass market services. The international SS7 protocol is defined by ITU-T in its Q.700-series recommendations.

MAP is one of the component protocols of SS7. It stands for "Mobile Application Part." MAP is intended to detect that a mobile equipment is roaming. The mobile equipment listens to the available visited networks and tries to connect to the network presenting the strongest signal on its BCCH channel. The mobile equipment sends a request for connection (Update Location Request) to its HLR (of the HPLMN) and this request is intercepted by the "steering of roaming" equipment of the HPLMN (the "steering of roaming" equipment is a HLR dedicated to receive the Update Location Requests). If the network to which the equipment wishes to connect is not the preferred one, the network sends an error message to the equipment. The latter then tries to connect to another network.

Another technique of steering is to update the EFPLMN-SEL. But this requires that the mobile equipment and the UICC (or e-UICC) support OTA commands.

The present invention proposes a method for steering efficiently a mobile equipment to a visited network, thereby increasing the percentage of successful attachments of roamers to preferred visited networks.

The present invention proposes a method for attaching a roaming telecommunication terminal to a visited network, this terminal comprising a security element, the method consisting in transmitting from the home network to the terminal a rejection message that is function of the features of the terminal and the security element.

Advantageously, the method consists to send previously from said telecommunication terminal to the HLR of the network an identifier of the telecommunication terminal.

The identifier of the telecommunication terminal is for example the IMEI of the terminal.

The security element is for example a UICC.

The rejection message is a UDV rejection message, a RNA rejection message, an OTA steering message or an OTA update message.

Advantageously, the security element stores credentials from the home network.

Other features and advantages of the invention will emerge more clearly from a reading of the following description of one preferred embodiment of the invention given by way of non-limiting illustrative example only and from the accompanying drawing.

BRIEF DESCRIPTION OF THE DRAWINGS

FIG. 1 is a simplified block schematic of an example of the method according the present invention.

In order to attach a roaming telecommunication terminal comprising a security element to a visited network of an operator (or a virtual operator), the invention proposes to transmit from the home network to the terminal a rejection message that is function of the features of the terminal and of the security element it contains.

The features of the terminal are for example deducted from its IMEI which is unique for each terminal. It can also be a combination of at least two of the following information: Manufacturer, model, type, version, . . . in order to precisely know which terminal is trying to connect to a visited network.

The rejection message also takes care of the security element (defined in a broad term by UICC or e-UICC) cooperating with the terminal: it can be a Sim, a USIM, . . . . The features of the UICC can be deducted from its ICCID or from its IMSI.

The features of the terminal and of the UICC can be transmitted by the terminal itself to the HPLMN when trying to connect to a visited network. The terminal can send an identifier to the HPLMN, for example its IMEI. It is also possible to send only the IMSI of the UICC to the HPLMN and the HPLMN will then associate features of the terminal that should be associated to this UICC (the HPLMN knows in which terminal the UICC is most probably inserted). When the UICC is embedded in the terminal in a non-extractible form (e-UICC), the HPLMN can deduct the features of the terminal from the IMSI or from the ICCID.

The main point is that the HPLMN, or more precisely, the "steering of roaming" equipment of the HPLMN, has to know precisely which are the features of the terminal and the associated UICC that is trying to connect to a visited network.

Thanks to this information, the HPLMN can send a rejection message to the terminal/UICC which is adapted to this terminal and the UICC it contains or cooperates with. The terminal and the UICC are then able to understand and execute the commands received from the HPLMN.

As an example, it is useless to send to a mobile equipment a RNA rejection message (Roaming Not Allowed) or a UDV rejection message (Unexpected Data Value) if this mobile is not able to understand or to manage it. On the side of the UICC, it is useless to send a "Refresh Initialization" command if the UICC is unable to execute it, even though the mobile equipment accepts Refresh STK commands.

With the precise knowledge of the mobile equipment and UICC features, the HPLMN is able to send to the mobile equipment/UICC commands that will steer the mobile to a preferred visited network.

FIG. 1 is a simplified block schematic of an example of the method according the present invention, this method being implemented at the level of the HPLMN of a roamer in a VPLMN.

The method begins with a start step 1. When receiving an Update Location Request of the mobile equipment (ME) attempting to attach to a visited network, the HPLMN knowing the features of the ME and of the associated UICC, verifies if the ME supports RNA commands (step 2). If yes, it is verified if the ME supports STK refresh commands (step 3). The purpose of this command is to ask the ME to read files that have been updated in the UICC during steering procedure. It is then verified if the UICC supports Refresh File commands (step 4). If yes, the HPLMN answers to the update location request with an update location answer containing a RNA rejection cause (step 5) forcing the ME to try to connect to another VPLMN.

If the answers to tests of steps 3 or 4 are negative, the process goes to step 9.

When the ME tries to attach the preferred network, the HPLMN accepts the update location request. Then, the ME is normally connected to a preferred visited network (step 6). According to the 3GPP 23.122 standard, when the HPLMN rejects the update location request using RNA rejection cause, the ME must write the rejected network in the list of forbidden networks of the UICC. As a result, the ME will never try again to attach this network. This could impact the user experience by causing a loss of network coverage in case the ME loose the radio signal of the preferred network on which it has been attached. Then, the HPLMN orders an OTA clear of the forbidden PLMN list in the UICC and triggers a Refresh file (step 7). If the ME is still not connected to a preferred network after the RNA procedure, the HPLMN triggers an OTA steering procedure which consists of clearing the forbidden PLMN list, updating the list of preferred PLMN list, clearing the registered network in the UICC and triggers a refresh initialization in the UICC (step 8). After this step 8, the ME initiates a network connection procedure forcing the ME to connect to the preferred network of the HPLMN operator.

It can be noted that steps 5 and 6 can be repeated a given number of times (for example max 3) as shown by dotted line 20 if the value of a counter 21 is not reached. This permits to try to connect the ME to a preferred network several times before executing step 8 if not successful.

If the ME is not RNA compliant (step 2) or does not support the STK Refresh command (step 3) or if the UICC does not support the Refresh file command (step 4) (answers NO to one of the steps 2 to 4), the HPLMN verifies if the ME supports UDV commands (step 9). If yes, the HPLMN can steer the ME by using SS7 UDV rejection message (step 10). After that UDV steering procedure the ME can be attached to the preferred network or not (step 11). If the ME is connected to the preferred network, the HPLMN checks if the ME accepts STK Refresh file commands (step 12). If yes, the HPLMN checks if the UICC accepts a Refresh File command (step 13). If yes, the HPLMN orders an OTA update of the preferred PLMN list into the UICC and it triggers a Refresh file of the ME through the UICC (step 7).

As before and indicated by dotted line 22, a counter can authorize the sending of a limited number (max 3 for example) of UDV rejection messages in order to force the ME to connect to a preferred network.

If the ME does not accept STK Refresh commands (step 12) or if the UICC does not accept a Refresh File command (step 13), the HPLMN orders an OTA update of the preferred PLMN list (EFPLMNSEL) on the UICC and asks the user to reboot his ME (by sending him a SMS asking for doing so) (step 14).

If the ME is not connected to a preferred network at step 11 (after the UDV procedure), the HPLMN verifies if the ME accepts a STK Refresh initialization command (step 15). If yes, the HPLMN verifies if the UICC accepts a Refresh Init command (step 16). If yes, the HPLMN orders an OTA steering, as described above (step 8). If the ME does not accept a Refresh STK command (step 15) or if the UICC does not accept a Refresh Init command (step 16), the HPLMN orders an OTA update of the preferred PLMN list on the UICC and asks the user to reboot his ME (by sending him a SMS asking for doing so) (step 14).

These different steps can be carried out by the HPLMN knowing the features of the ME and the UICC. The HPLMN can establish a table for each type of ME and UICC, this table indicating which command can be successfully sent to the ME/UICC, depending on the features of these elements.

It has to be noted that the method of the present invention does not necessarily begin with testing if the ME is RNA compliant. The start step 1 can link to step 9. It is also possible to start the process with step 15 if the operator decides not to use SS7 steering commands, for example if he suspects that an anti SS7 steering system is installed in the VPLMN.

The invention claimed is:

1. Method for attaching a roaming telecommunication terminal to a visited network, said terminal comprising a security element, said method comprising:
transmitting, from a home network of said terminal to said terminal, a rejection message whose content is a function of the technical features of said terminal and of said security element,
said technical features of said terminal being determined based upon on one of: (i) an International Mobile Equipment Identity (IMEI) of said terminal or (ii) a combination of at least two of: a manufacturer, a model, a type, and a version of said terminal, and
said technical features of said security element being determined on the basis of: (i) an Integrated Circuit Card Identifier (ICCID) of said security element or (ii) an International Mobile Subscriber Identity (IMSI) of said security element,
wherein the transmitted rejection message is configured to cause said terminal to attach to a preferred visited network.

2. Method according to claim 1, wherein the method further comprises:
sending, from said telecommunication terminal to the Home Location Register (HLR) of the home network, an identifier of said telecommunication terminal, prior to the transmitting step.

3. Method according to claim 2, wherein said identifier is the IMEI of said terminal.

4. Method according to claim 1, wherein said security element is a Universal Integrated Circuit Card (UICC).

5. Method according to claim 1, wherein said message is a Unexpected Data Value (UDV) rejection message.

6. Method according to claim 1, wherein said message is a Roaming Not Allowed (RNA) rejection message.

7. Method according to claim 1, wherein said message is an Over-the-Air (OTA) steering message.

8. Method according to claim 1, wherein said message is an Over-the-Air (OTA) update message.

9. Method according to claim 1, wherein said security element stores credentials from said home network.

10. A method for attaching a roaming telecommunication terminal to a visited network, said terminal comprising a security element, said method comprising:
receiving, from said terminal, data related to technical features of the terminal and of the security element;
determining, based on said data related to the technical features of the terminal and of the security element, an appropriate method for communicating with said terminal to steer said terminal to a preferred network;

transmitting, based on said determining step, a rejection message whose content is a function of the technical features of said terminal and of said security element, said technical features of said terminal being determined on the basis of: (i) an an International Mobile Equipment Identity (IMEI) or (ii) a combination of at least two of: a manufacturer, a model, a type, and a version of said terminal, and (i) an Integrated Circuit Card Identifier (ICCID) of said security element or (ii) an International Mobile Subscriber Identity (IMSI) of said security element, wherein said transmitted rejection message forces said terminal to attach to said preferred network.

* * * * *